June 22, 1926.

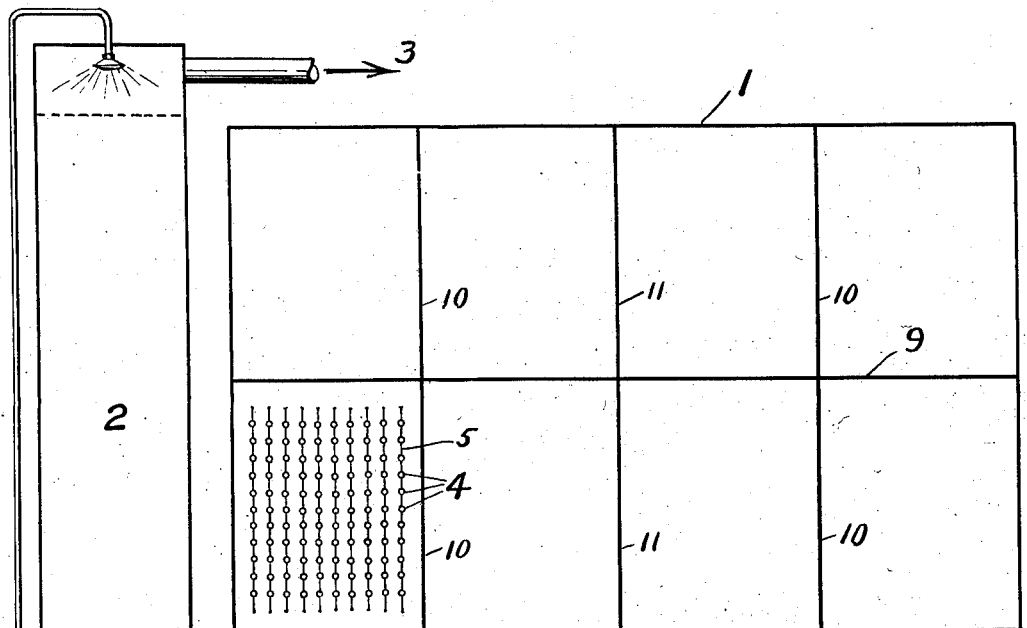
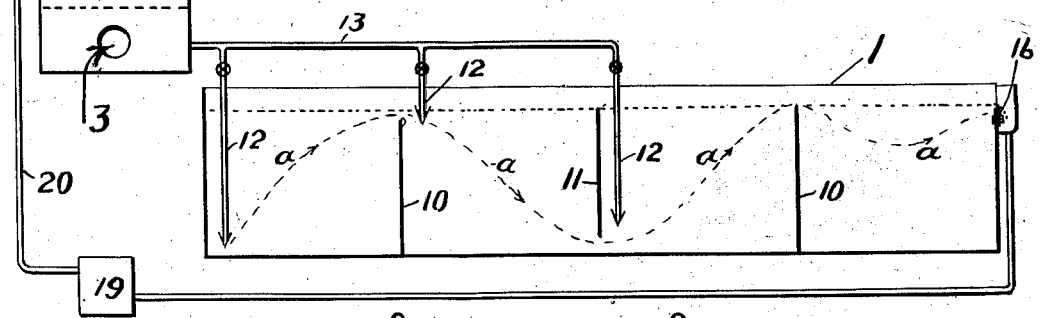
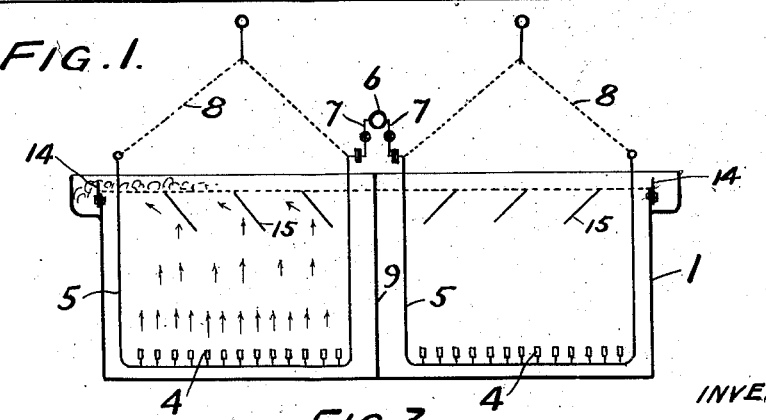

W. H. FULWEILER

GAS PURIFICATION

Filed Feb. 27, 1925

WITNESS:

INVENTOR
Walter H. Fulweiler
BY
Augustus B. Stoughton
ATTORNEY

Patented June 22, 1926.

1,589,749

UNITED STATES PATENT OFFICE.

WALTER H. FULWEILER, OF WALLINGFORD, PENNSYLVANIA, ASSIGNOR TO THE U. S. I. CONTRACTING COMPANY, OF PHILADELPHIA, PENNSYLVANIA, A CORPORATION OF DELAWARE.

GAS PURIFICATION.

Application filed February 27, 1925. Serial No. 11,980.

The present invention relates to improvements in the purification of gases by scrubbing them with an alkaline solution capable of absorbing hydrogen sulphide as alkaline sulph-hydrate and then regenerating or actifying the sulph-hydrate in the solution by the action of air producing free sulphur.

The principal objects of the present invention are, first, to improve the action of the air in respect to application, control and distribution and in other respects; second, to provide for limiting the concentration of the foul solution, in the process of its being actified, in respect to the hydrogen sulphide content, as alkaline sulph-hydrate, per unit of volume of the solution being actified, thereby insuring the precipitation of free sulphur; third, to prov··e for foaming off the free sulphur recover .1 from the actification of the foul solution; fourth, to make the process efficient; and fifth, to facilitate the actification.

To these and other ends hereinafter set forth, the invention comprises the improvements in apparatus and in methods hereinafter described and of which the latter are claimed herein and the former are claimed in a companion application, Serial No. 729,519.

In the following description reference will be made to the accompanying drawings forming part hereof and in which there is illustrated apparatus embodying features of the invention and capable of use in the practice of the method of the invention.

In the drawings—

Figure 1 is a diagrammatic and schematic view illustrative of a complete plant embodying features of the invention.

Fig. 2 is a top or plan view of a portion of the same.

Fig. 3 is a cross-sectional view which may be regarded as taken generally across the tank shown at the lower portion of Figure 1.

Figure 4:
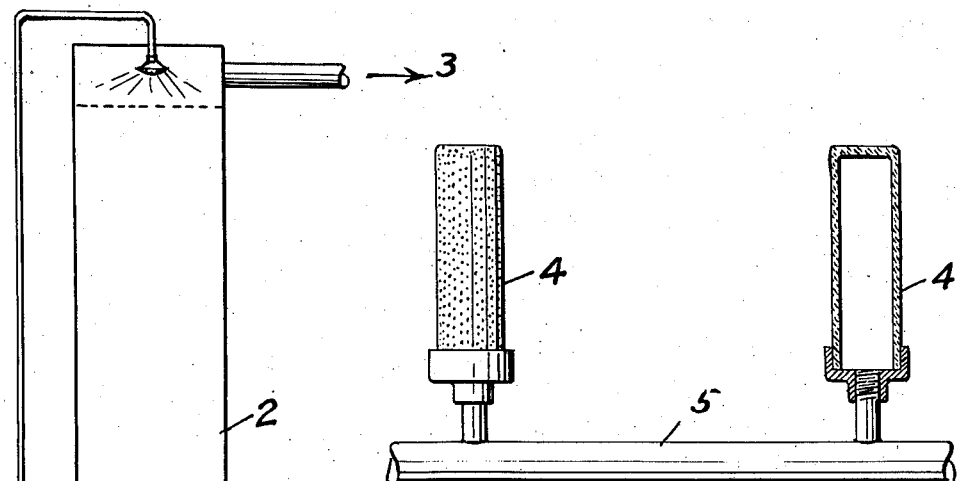
Fig. 4 is an elevational view of which a portion is in section and it is drawn to an enlarged scale.

Referring to the drawings, more particularly Figs. 1 to 4, 1, generally, is an actifying tank to which foul solution or alkaline solution which has been used to scrub gas for the removal of impurities of which hydrogen sulphide is an example, is led and from which the actified solution is returned to the tower. The arrows 3 indicate the direction of travel of gas through the tower 2, and internally the tower 2 may be fitted with suitable devices commonly employed in scrubbers and too well understood by those skilled in the art to require further description or illustration. In the actifying tank 1 the solution is subjected to the action of air or is aerated. For this purpose use is made of foraminous or porous hollow cylinders or bodies 4, Fig. 4. These hollow bodies 4 withstand high pressure air, the use of which is desirable. An example of material from which to make the bodies 4 is alundum. The bodies 4 may be readily removed and cleaned. A group of bodies 4 may well be mounted upon a manifold 5 of generally U-shape, and each manifold may be connected with a header 6 through a branch 7, having a valve and a coupling therein. Yokes 8 may be provided for the manifolds so that one or more manifolds may be removed from the tank for cleaning or other purposes without disturbing the rest of the manifolds. The end of the manifold opposite to the branch 7 is of course closed and an air pressure of eight pounds, more or less, may be applied to the inside of the bodies or cylinders 4. The air may be applied at the rate of from forty to seventy cubic feet per square foot of surface of the bodies 4 per minute. Evidently the valved branches 7 permit of the regulation of the air supply at different parts of the tank. The employment of the foraminous bodies 4 extending upward from the bottom of the tank into the contents thereof insures a large area over which the air is applied and the action between the solution and the air is a surface action so that this is a matter of considerable importance. By way of further description of the hollow bodies 4, it may be said that there should be a loss of more than one-half pound in pressure when passing one cubic foot of air per square foot per minute and it is well that the loss should be in the neighborhood of a pound. This represents a material having interstices or pores in its outer surfaces smaller than 0.000007 sq. in. and preferably about 0.000003 sq. in. being about 30,000 to 60,000 to the square inch. The tank 1 is sub-divided by partitions of which one 9 extends lengthwise and of which the others are arranged crosswise, and of the crosswise partitions some, 10, extend to the bottom of the tank, and others, 11, stop short of the bottom of the tank, thus the flow is in the direction of the dotted line a. The foul solution escaping from the bottom of the tower 2 is delivered by the valved branches 12 of the pipe 13 to the spaces between the crosswise partitions. By regulating the valves in these branches, it is possible to hold down the concentration of the foul solution in process of being actified in respect to the hydrogen sulphide content, as alkaline sulphydrate, per unit of volume of the solution being actified. The concentration should be such that free sulphur will be precipitated. If the concentration is too high, free sulphur is not precipitated properly and there is a tendency for the action to go to thiosulphate which is inert.

The concentration of thiosulphate above twenty grains per litre in the contents of the tank produces foaming off of the free sulphur. The sulphur rises as a foam and in order to draw it off with the foam there is provided an adjustable dam 14, and also inclined baffle plates 15. The sulphur floats for a short time, perhaps 15 minutes, more or less, and then sinks. For this reason the dam 14 may well be adjusted to take off the upper third, more or less, of the foam. The level of the fluid in the tank may be maintained by an adjustable overflow indicated at 16. The ascending air causes a movement in the fluid and the baffle plates direct this movement so far as the foam is concerned toward the adjustable dam 14. The ascending air also tends to lift the foam and in that way more or less of it may be taken off by adjusting the dam 14.

Figure 5:
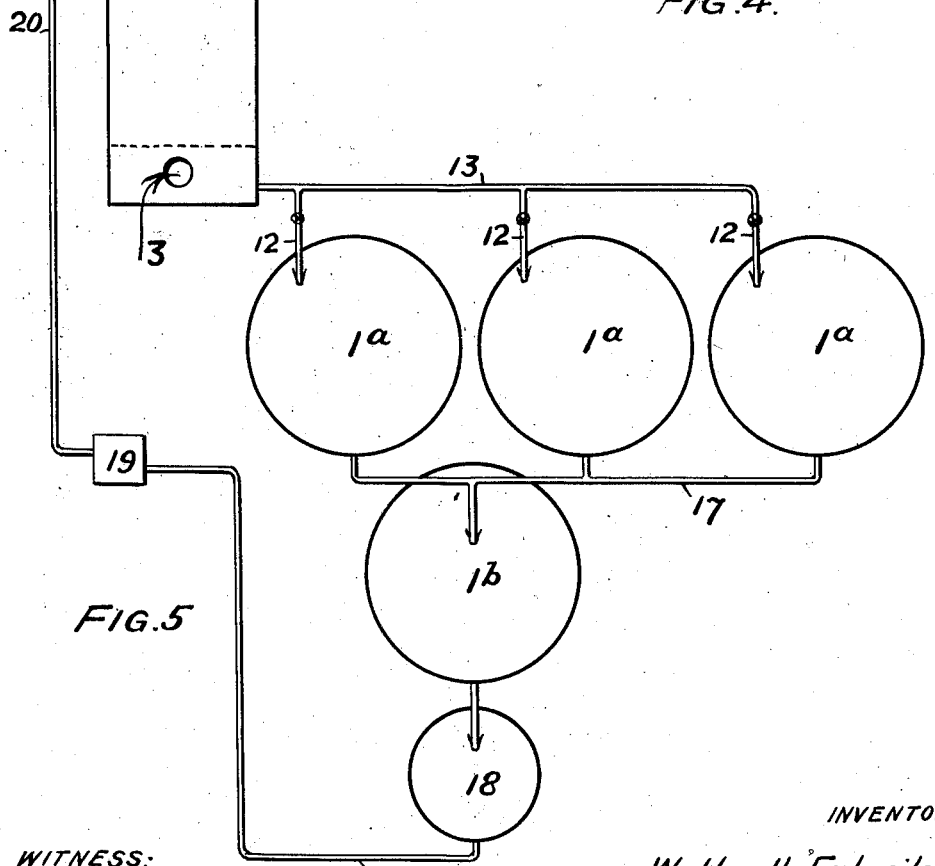
Fig. 5 is a view similar to Figure 1 illustrating a modification.

The weak alkali or soda solution should be appropriate to absorb not over fifty grains of hydrogen sulphide per gallon of solution in cases where high efficiency is desired. To get the maximum deposition of free sulphur the ratio of bi-carbonate to carbonate is between six and fourteen times as much bi-carbonate as carbonate. The ratio may be increased by reduction of the air-blowing and lowered by blowing more air. It may be remarked that the carbon dioxide in the gas gives rise to the carbonate or bi-carbonate in the alkaline solution. Efficiency is promoted by the presence of soluble iron sulphide in the weak alkaline solution and of course the kind of soluble iron sulphide contemplated is not precipitated. This can be accomplished by adding a solution of copperas in water to a large quantity of fouled solution and allowing it to settle. A portion of the iron sulphide is precipitated and is not useful in the process. Another portion remaining in soluble form is present in the supernatant liquor which is drawn off for use. A sufficient quantity of the supernatant liquor is put into the alkaline solution so that the amount of iron approximates 0.2 gram per litre. The added iron being already sulphide, cannot remove hydrogen sulphide from the gas but its presence increases the efficiency of the process. The construction and mode of operation of the apparatus shown in Fig. 5 are as has been described except that the tank, or, more accurately, the sub-divisions $1^a$ that make up the tank are separate units having separate valved supply connections and common outlet connections 17 to the sub-division $1^b$. There is also shown a sump 18.

The pump 19 serves to return the actified solution to the top of the tower by way of the pipe 20 in the constructions of both Fig. 1 and Fig. 5.

It will be obvious to those skilled in the art to which the invention relates that modifications may be made in procedure and in matters of mere form without departing from the spirit of the invention which is not limited as to those matters or otherwise than as the prior art and the appended claim may require.

I claim:

In the purification of gas by scrubbing it with a weak alkaline solution the process of actifying the foul solution containing alkaline sulphydrate which consists in releasing sulphur as such from the alkaline sulphydrate by the action of air and foaming off the sulphur by regulating the air and maintaining the concentration of the thiosulphate in the solution above twenty grams per litre.

WALTER H. FULWEILER.